United States Patent [19]

Bartholomew

[11] 4,372,684

[45] Feb. 8, 1983

[54] HOLOGRAPHIC APPARATUS TO MEASURE THE SURFACE FIGURE OF A NONLINEAR AXICON AND OTHER OPTICAL ELEMENTS

[75] Inventor: Bruce J. Bartholomew, Poway, Calif.

[73] Assignee: General Dynamics Corporation/Convair Div., San Diego, Calif.

[21] Appl. No.: 263,286

[22] Filed: May 13, 1981

[51] Int. Cl.³ ............................................. G01B 9/021
[52] U.S. Cl. ................................................. 356/348
[58] Field of Search ................ 356/347, 348; 350/3.81

[56] References Cited

U.S. PATENT DOCUMENTS 3,797,938 3/1974 Heflinger et al. ................. 356/348

OTHER PUBLICATIONS

Hansler, "Application of Holographic-Interferometry to the Comparison of Highly Polished Reflecting Surfaces", *Applied Optics*, vol. 7, No. 4, pp. 711-712, 4168.

*Primary Examiner*—John K. Corbin
*Assistant Examiner*—Matthew W. Koren
*Attorney, Agent, or Firm*—John R. Duncan; Frank D. Gilliam

[57] ABSTRACT

A method and apparatus are disclosed for testing nonlinear axicons utilizing holographic interferometry with simple, low cost, optical elements and with a new technique illuminating the entire surface under test.

A similar method and apparatus are also disclosed as useful in testing plane or convex mirrors.

10 Claims, 3 Drawing Figures

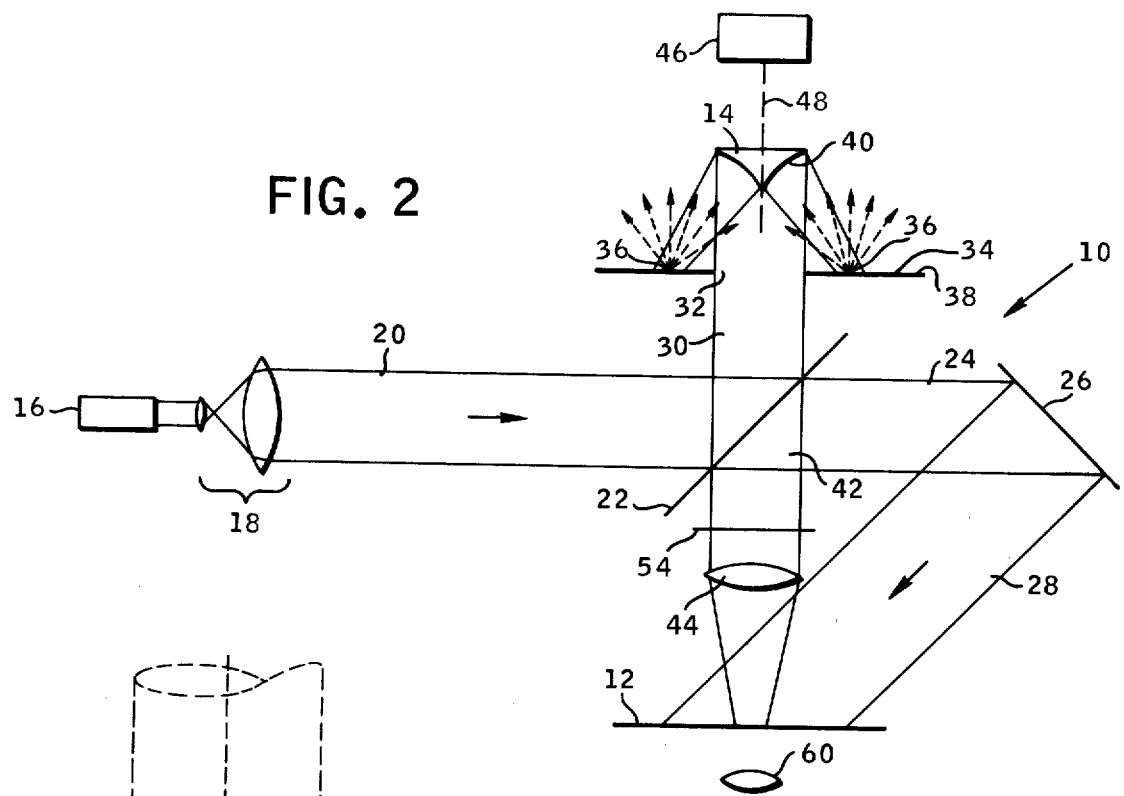
FIG. 2
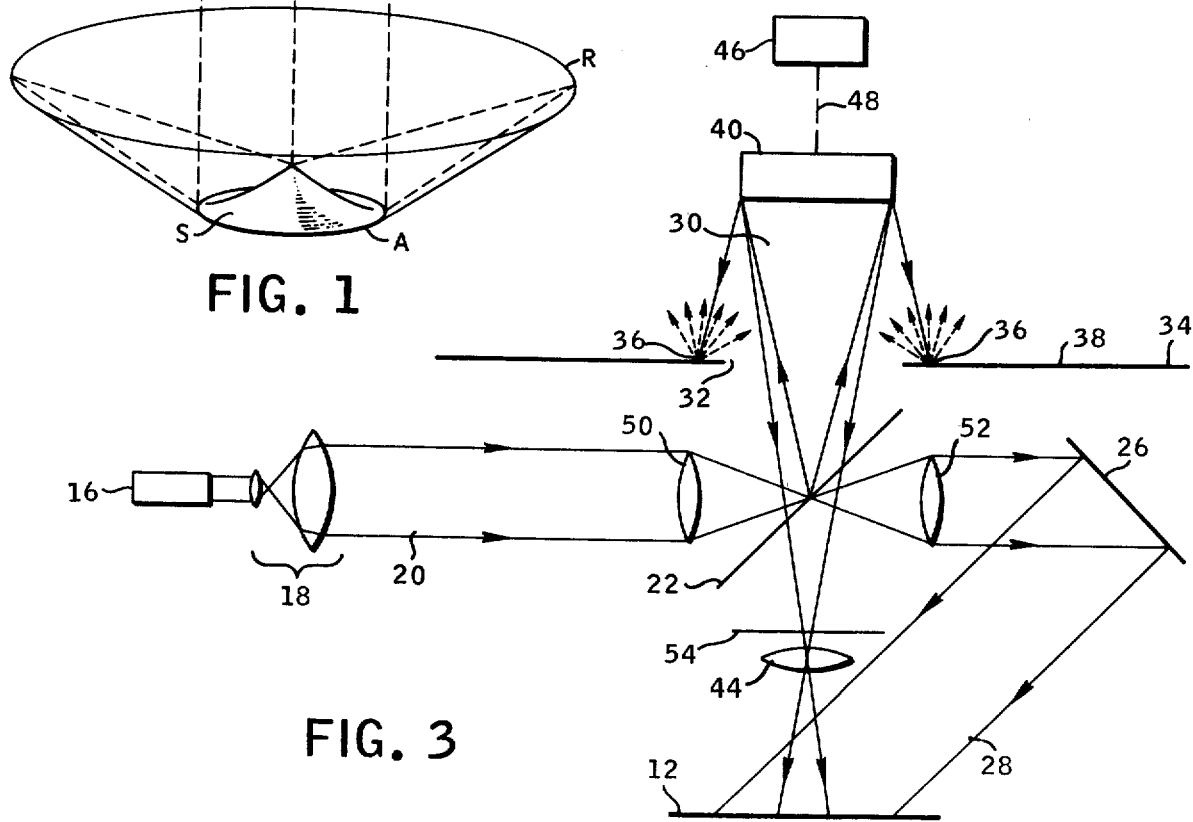
FIG. 1
FIG. 3

HOLOGRAPHIC APPARATUS TO MEASURE THE SURFACE FIGURE OF A NONLINEAR AXICON AND OTHER OPTICAL ELEMENTS

BACKGROUND OF THE INVENTION

This invention relates, in general, to a method and apparatus for testing optical elements and is particularly directed to a method and apparatus for testing nonlinear axicons.

A nonlinear axicon is a conical mirror whose surface is generated by rotating a parabola about an axis parallel to the axis of the parabola. The fundamental difference between an axicon and more conventional optical elements is that it focuses light to a ring instead of a point, and therefore, the testing of the axicon itself, having such a toroidal symmetry, for optical tolerances is very difficult. No reference optical elements exist that focus light to a ring, yet, a test is definitely needed so that the axicon can be fabricated for use in precision optical systems.

Consideration was given to conventional optical figure measuring techniques, such as listed in *Optical Shop Testing* by Daniel Malacara, John Wiley and Sons, New York, 1978, and modifications of such techniques, but it became apparent that the fundamental differences between point focus and ring focus optics required a new approach. Optical components that can be used as reference surfaces for the axicon do not exist because of the toroidal symmetry of the axicon makes these components difficult to produce and no testing techniques are known that will verify the correctness of the reference surface. The new approach had to be one that was not based on the properties of a focal ring (because of the difficulties of making large diameter circles accurate to a part in $10^6$), did not require a reference surface, and provided total illumination of the toroidal test surface.

Thus, holographic interferometry for optical testing was selected, particularly, a method involving diffusely reflecting objects. However, the limitation in the conventional method of diffuse object holography requiring the recording medium to interrupt the reflected beam (ie, that portion of the coherent light that strikes the recording medium directly), posed a serious problem in the case of the axicon.

One solution to a similar problem was suggested in a paper by Hansler, "Application of Holographic Interferometry to the Comparison of Highly Polished Reflecting Surfaces", *Applied Optics*, Vol. 7, No. 4, April 1968, pp 711-712, in which a scattering surface was illuminated by an object beam. However, this latter technique was not sufficient for testing the axicon because of the necessity of uniformly illuminating the whole surface for a good optical test, The Hansler method illuminated only a small fraction of the entire surface.

A method of illuminating the whole surface of a diffusive medium is also disclosed in U.S. Pat. No. 3,799,643 to Mailer but this method did not relate to interferometry.

SUMMARY OF THE INVENTION

The system and the method practiced therein for testing a nonlinear axicon and which overcomes the deficiencies of the aforementioned prior art comprises an apparatus in which the axicon reflected the light from a laser beam to form an annular light beam that strikes a diffusely reflecting surface. The scattered light is reflected back to uniformly illuminate the surface of the axicon. The light is then reflected off the axicon and through an aperture in the diffusing screen to an imaging lens which focuses the beam onto the holographic recording medium where, with a reference beam, a hologram of the whole toroidal surface of the axicon can be recorded. The hologram is then developed and fixed using the techniques appropriate for the particular holographic recording medium being used. If the hologram was removed it must be replaced in the position used for recording. A real-time recording material is suggested so that the hologram does not have to be moved for processing. The axicon is again illuminated by the laser beam. The light from the axicon and the reconstructed axicon image produced by the hologram interfere to produce a holographic interferogram. By rotating the axicon about its longitudinal axis, an interferogram of the toroidal surface of the axicon is produced. Thus, with this method and apparatus all radii of the entire azimuthal surface figure of the axicon are verified simultaneously.

It will be apparent to those skilled in the art, after a study of the following drawings and detailed description that this holographic interferometric, technique is a null test since an axicon with perfect rotational symmetry should have no fringes if there are no azimuthal errors. It should also be apparent that the formation of a perfect circle or the use of any sophisticated optical components are not required. Furthermore, since the axicon itself is the only item that moves in the apparatus to produce the fringes, all errors in lenses, mirrors, beamsplitters, or in the diffusing screen, are automatically cancelled. Finally, it is clear that an additional test of the radial profile of the axicon is required to completely verify the surface figure. But the surface profile can easily be checked along a single radius using any standard technique designed for parabolas. The combination of a conventional technique for measuring the radial profile and the new holographic technique for measuring the azimuthal surface deviations will determine the surface figure completely.

Finally, utilizing the teachings of this method and apparatus for testing a nonlinear axicon, the same principle can be applied in the measuring of the surface figure of plane or convex mirrors.

BRIEF DESCRIPTION OF THE DRAWINGS

FIG. 1 illustrates a nonlinear axicon focusing a collimated beam to a ring,

FIG. 2 is a simplified illustration of a system for testing and inspecting the toroidal surfaces of a nonlinear axicon by holographic interferometry, and FIG. 3 is a holographic interferometric system for testing optics having either planar or convex surfaces utilizing the teachings of this invention; both systems illustrate the apparatus in which the inventive method may be performed.

DETAILED DESCRIPTION

FIG. 1 shows the above mentioned nonlinear axicon A focusing a collimated beam B of light striking surface S to a ring R. This property, ie, focusing to a ring instead of a point, is the fundamental difference between the axicon and the more conventional optical elements and because of this property allows the axicon to be used in conjunction with a ring element (not shown)

located at the focal ring R to convert the beam B into an annular beam.

Turning now to FIG. 2, there is shown a test system 10 for holographic interferometry with a holographic medium 12 on which the hologram of a nonlinear axicon 14 is to be formed. A source of coherent light (laser) 16 through a lens system 18 directs an incident beam 20 to a beamsplitter 22 which divides the beam 20 into two parts; one part 24 is directed to a mirror 26 which reflects this part to the holographic medium as the reference beam 28. The other part 30 of the split beam, as an object beam, is directed toward the axicon 14 through an aperture 32 in an opaque diffusing screen 34. The axicon provides an annular ring of light 36 that strikes the upper surface 38, the scattering surface of the opaque diffusing screen 34, and this scattered light is reflected back to uniformly illuminate the toroidal surface 40 of the axicon. This light is reflected by the axicon as a beam 42 through the aperture 32 in the diffusing screen through a polarizing filter 54 to an imaging lens 44 which focuses this beam onto the holographic recording medium.

Using this optical system a hologram is recorded. The hologram is processed using the technique appropriate for the recording medium. If the hologram was removed for processing it is replaced in exactly the same position used for recording. The laser is turned on again and the axicon is rotated, using some suitable means 46, about its longitudinal axis 48. The image of the rotated axicon interferes with the image of the axicon in its original position as reconstructed by the hologram to form the holographic interferogram. The fringe pattern in the holographic interferogram can be observed and/or recorded using an appropriate optical system 60 such as an eye or camera. If the axicon has perfect rotational symmetry no fringes will appear. If the axicon does not have rotational symmetry or if the axicon is displaced slightly as it is rotated a fringe pattern appears that can be used to determine the surface figure errors.

Turning now to FIG. 3, there is shown a similar test system for measuring the surface figure 40 of a plane or convex mirror. To simplify the description, those parts having the same function in this system are given the same reference numerals as in FIG. 1. The difference in this figure is that two focusing lenses 50 and 52 are added. The first lens 50 focuses the beam to a point on the beamsplitter and is again collimated by the second lens 52 as it is directed toward the reflecting mirror 26 to become the reference beam. The point source of light striking the beamsplitter is directed as an object beam 30 through the aperture 32 in the diffusing screen 34 and directed toward the plane or convex mirror surface 40 which in turn reflects light to the scattering surface 38. The scattering surface illuminates the entire mirror which light is then directed through the aperture 32 through the polarizing filter 54 and the focusing lens 44 to form the hologram. Rotational movement of the mirror about its axis will produce fringes, if the mirror is not optically perfect, as in the case of the axicon.

In connection with this invention, the holographic medium useful in making real time interferograms was found to be Type H-1 photopolymer obtainable from the Newport Research Corporation of Fountain Valley, Calif. Newport Research Corporation also sells a thermoplastic holographic recording medium with greater sensitivity than the photopolymer that will work well in this system. It is important that a real-time holographic material be used if possible so that the hologram does not have to be moved for processing.

What is claimed is:
1. A holographic interferometric apparatus for testing optical surface figures comprising:
   a holographic medium,
   means for forming a reference beam of light directed onto said holographic medium,
   means for forming an object beam of spatially coherent light directed toward and incident first on said surface to be tested,
   means for forming a source of scattered light which is temporally coherent from said object beam of spatially coherent light directed from said surface to be tested and for directing the scattered light back to the test surface thereby illuminating the entire test surface, and
   means for directing the scattered light from the entire test surface to the holographic medium to form a hologram.
2. The apparatus as claimed in claim 1 further including means for rotating said test surface to form an interferogram between the rotated test surface image and the unrotated image reconstructed from the hologram as a test of the optical properties of said test surface.
3. The apparatus as claimed in claim 2 wherein said test surface is an axicon.
4. The apparatus as claimed in claim 3 wherein said means for forming the source of scattered light includes said axicon and a diffusing screen located to receive the light reflected by said test surface toward said screen.
5. The apparatus as claimed in claim 4 wherein said means for forming said object beam and said reference beam comprises a source of coherent light, a beamsplitter, and a mirror, said coherent light being directed toward said beamsplitter where said coherent light beam is split into two parts, one part directed to said mirror and reflected toward said holographic medium, while the other part is directed toward said test surface.
6. The apparatus as claimed in claim 5 wherein said diffusing screen is located between said beamsplitter and said test surface and is provided with an aperture to allow said object beam to strike said test surface and to allow the illuminated test surface light from said scattered light source to be directed toward said holographic medium.
7. The apparatus as claimed in claim 2 wherein said test surface has toroidal symmetry.
8. The apparatus as claimed in claim 2 wherein said test surface is planar.
9. The apparatus as claimed in claim 2 wherein said test surface is convex.
10. A method for testing an entire nonlinear surface by holographic interferometry comprising,
    providing a source of spatially coherent light,
    directing said spatially coherent light first onto the surface to be measured,
    directing a beam of temporally coherent scattered light reflected from said surface onto a holographic medium,
    forming a reference beam and directing said beam to said holographic medium, and
    rotating said surface to form an interferogram between the rotated surface image and the unrotated image reconstructed by the hologram which indicates errors in the surface figure of said surface.

* * * * *